(12) United States Patent
Cuppers et al.

(10) Patent No.: US 8,465,394 B2
(45) Date of Patent: Jun. 18, 2013

(54) METHOD FOR OPERATING A TRANSMISSION DEVICE OF A VEHICLE DRIVETRAIN

(75) Inventors: Ruben Cuppers, Wangen (DE); Werner Fuchs, Markdorf (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 19 days.

(21) Appl. No.: 13/387,866

(22) PCT Filed: Jul. 22, 2010

(86) PCT No.: PCT/EP2010/060654
§ 371 (c)(1),
(2), (4) Date: Jan. 30, 2012

(87) PCT Pub. No.: WO2011/015466
PCT Pub. Date: Feb. 10, 2011

(65) Prior Publication Data
US 2012/0135838 A1    May 31, 2012

(30) Foreign Application Priority Data
Aug. 6, 2009   (DE) .......................... 10 2009 028 305

(51) Int. Cl.
*B60W 10/04*    (2006.01)
(52) U.S. Cl.
USPC ....................................................... 477/109
(58) Field of Classification Search
None
See application file for complete search history.

(56) References Cited

U.S. PATENT DOCUMENTS

| | | | | |
|---|---|---|---|---|
| 6,394,931 B1 * | 5/2002 | Genise | ............................. | 477/97 |
| 6,520,889 B1 * | 2/2003 | Hughes et al. | ................. | 477/107 |
| 6,705,971 B2 * | 3/2004 | Kayano et al. | ................. | 477/110 |
| 6,962,549 B2 | 11/2005 | Dreibholz et al. | | |
| 7,442,148 B2 * | 10/2008 | Eckle et al. | .................... | 477/115 |
| 7,682,281 B2 | 3/2010 | Ziemer | | |
| 7,789,792 B2 | 9/2010 | Kamm et al. | | |
| 7,976,431 B2 | 7/2011 | Bader et al. | | |
| 8,079,936 B2 * | 12/2011 | MacFarlane et al. | ......... | 477/109 |
| 2010/0130323 A1 | 5/2010 | Gumpoltsberger | | |
| 2010/0331137 A1 | 12/2010 | Kamm et al. | | |
| 2011/0263380 A1 * | 10/2011 | Cuppers et al. | ............... | 477/111 |
| 2013/0035206 A1 * | 2/2013 | Herbeth et al. | ............... | 477/109 |

FOREIGN PATENT DOCUMENTS

| | | |
|---|---|---|
| DE | 102 44 023 A1 | 4/2004 |
| DE | 600 07 695 T2 | 10/2004 |
| DE | 10 2004 014 081 A1 | 10/2005 |
| DE | 10 2005 002 337 A1 | 8/2006 |

(Continued)

*Primary Examiner* — Dirk Wright
(74) *Attorney, Agent, or Firm* — Davis & Bujold, PLLC

(57) ABSTRACT

A method of operating a transmission of a vehicle drive-train that comprises frictional shifting elements and an interlocking shifting element. In the neutral operating condition of the transmission, and in the case of an operating condition variation of the vehicle drive-train in which, when it is required to establish the force flow in the transmission, the interlocking shifting element is to be changed from a disengaged to an engaged operating condition, by increasing the transmission capacities of at least two frictional shifting elements which have to be engaged for producing the force flow, a rotational speed difference in the area of the interlocking shifting element is determined, and a drive torque of a drive machine is adjusted to a level that brings the speed difference within a predefined range at which the interlocking shifting element is approximately synchronized and can therefore be engaged.

7 Claims, 4 Drawing Sheets

FOREIGN PATENT DOCUMENTS

| | | |
|---|---|---|
| DE | 10 2007 043 695 A1 | 3/2009 |
| JP | 6-323377 A | 11/1994 |
| WO | 2006/074707 A1 | 7/2006 |
| WO | 2008/138723 A1 | 11/2008 |

* cited by examiner

|     | A | B | C | D | E |
|-----|---|---|---|---|---|
| "1" | ● | ● | ● |   |   |
| "2" | ● | ● |   |   | ● |
| "3" |   | ● | ● |   | ● |
| "4" |   | ● |   | ● | ● |
| "5" |   | ● | ● | ● |   |
| "6" |   |   | ● | ● | ● |
| "7" | ● |   | ● | ● |   |
| "8" | ● |   |   | ● | ● |
| "R" | ● | ● |   | ● |   |

Fig. 3

METHOD FOR OPERATING A TRANSMISSION DEVICE OF A VEHICLE DRIVETRAIN

This application is a National Stage completion of PCT/EP2010/060654 filed Jul. 22, 2010, which claims priority from German patent application serial no. 10 2009 028 305.6 filed Aug. 6, 2009.

FIELD OF THE INVENTION

The invention concerns a method for operating a transmission device of a vehicle drive-train.

BACKGROUND OF THE INVENTION

Transmission devices known per se and designed as automatic transmissions, such as a multi-stage transmission described for example in DE 10 2005 002 337 A1, are constructed in order to obtain various gear ratios with shifting elements by means of which in each case an applied torque can be transmitted by frictional means. When the engagement of a particular gear ratio has been called for, in each case at least one or more of the frictional shifting elements are disengaged from the force flow of a transmission device while at least one further frictional shifting element, or others, are engaged in the force flow of the transmission device in order to obtain the required gear ratio. During the process of engaging a frictional shifting element, no special synchronization measures are needed to ensure a desired level of shifting comfort, since with frictional shifting elements a desired shifting comfort can be achieved at defined contact pressures within a broad band of rotational speed differences. Automatic transmissions so constructed are disclosed in both WO 2008/138732 A1 and DE 102 44 023 A1.

Since in a manner known per se such transmission devices can only be operated with unsatisfactory efficiencies because of drag losses that occur in the area of open frictional shifting elements, certain frictional shifting elements are replaced by interlocking shifting elements. In such automatic transmissions, which are made with both frictional shifting elements and at least one interlocking shifting element and with a corresponding gearset configuration, to implement a particular shift command at least one interlocking shifting element has to be engaged in a force flow of the transmission device.

Disadvantageously, compared with frictional shifting elements, interlocking shifting elements with or without additional structural synchronization devices can only be engaged comfortably at very low speed differences, i.e. close to their synchronous rotational speed, and this impairs to an undesired extent the operation of a transmission device designed as an automatic transmission and comprising at least one interlocking shifting element, at any rate while carrying out certain gearshifts that involve an interlocking shifting element. In some circumstances a shift operation called for can only be completed after the lapse of an undesirably long shifting time, since before the interlocking shifting element involved in producing the gearset called for is engaged, the speed difference in the area of the interlocking shifting element has to be adjusted to a value at which the interlocking shifting element can be shifted to its engaged operating condition.

However, additional structural measures for synchronizing interlocking shifting elements of transmission devices so as to be able to carry out a required shift within an acceptable shifting time along with a high level of shifting comfort, undesirably increase both the manufacturing costs of transmission devices and the space they occupy.

SUMMARY OF THE INVENTION

Accordingly, the purpose of the present invention is to provide a method for operating a transmission device, by virtue of which gearshifts in the transmission devices that involve at least one interlocking shifting element can be carried out within a predefined shifting time with a high level of shifting comfort, inexpensively and without the need for additional fitting space for the transmission device.

In the method according to the invention for operating a transmission device of a vehicle drive-train with a plurality of frictional shifting elements and at least one interlocking shifting element for obtaining various gear ratios, in the neutral operating condition of the transmission device, in which the force flow is interrupted in the area of the transmission device, and if the operating condition sequence of the vehicle drive-train is such that when the force flow in the transmission device is to be established, the at least one interlocking shifting element has to be changed from an open to a closed operating condition, by increasing the transmission capacity of at least two frictional shifting elements that have to be engaged in order to establish the force flow to a level at which the shifting elements are in a slip-free operating condition, a speed difference is determined in the area of the interlocking shifting element. A drive torque of a drive machine of the vehicle drive-train is set at a level that brings the speed difference in the area of the interlocking shifting element within a predefined speed difference range in which the condition of the interlocking shifting element is at least approximately synchronized, so that it can be closed.

In this way the at least one interlocking shifting element is synchronized in a defined manner before its closing process, without additional structural synchronizing devices but by an appropriate operation of devices already present in a transmission device, i.e. in this case by means of at least two frictional shifting elements and in addition by action upon the motor, during or before a required establishment of the force flow in the area of the transmission device, and this is achieved effectively, inexpensively and with little need for the transmission device to occupy more fitting space, so that changes of the operating condition of, or gearshifts in the transmission device can be carried out with a high level of shifting comfort and at the same time within acceptable shifting times.

In an advantageous variant of the method according to the invention the transmission capacities of the two frictional shifting elements are reduced essentially to zero before the interlocking shifting element is engaged, whereby in a simple manner, for the driver of the vehicle, the closing process of the interlocking shifting element is prevented from giving rise to unexpected reactions in the vehicle drive-train, such as shifting jerkiness or the like caused by a sudden formation of the force flow in the area of the transmission device.

In a further variant of the method according to the invention, at the moment when the interlocking shifting element is engaged and after its engagement, one of the two frictional shifting elements is acted upon with an actuating force such that an increase of the actuating force brings about an immediate increase of the transmission capacity of the frictional shifting element concerned. In this way the frictional shifting element is in an operating condition starting from which the force flow can be established in the area of the transmission device within the shortest time and with high shifting comfort.

From the moment when the interlocking shifting element is engaged, the drive torque of the drive machine can be brought to a required, operating-condition-dependent level such that the vehicle drive-train or its drive machine is adjusted to an operating condition for example earlier than the motor action required for synchronizing the interlocking shifting element, and the vehicle drive-train is operated in the manner envisaged.

In a further variant of the method according to the invention, the operating-condition-dependent level of the drive torque of the drive machine is equivalent to an idling speed of the drive machine.

Preferably, to determine the rotational speed difference in the area of the interlocking shifting element, two rotational speed sensors are provided, one of these being arranged on the transmission input side and the other on the transmission output side.

BRIEF DESCRIPTION OF THE DRAWINGS

Other advantages and advantageous developments of the invention emerge from the claims and from the example embodiment whose principle is described with reference to the drawings, which show:

Figure 3:
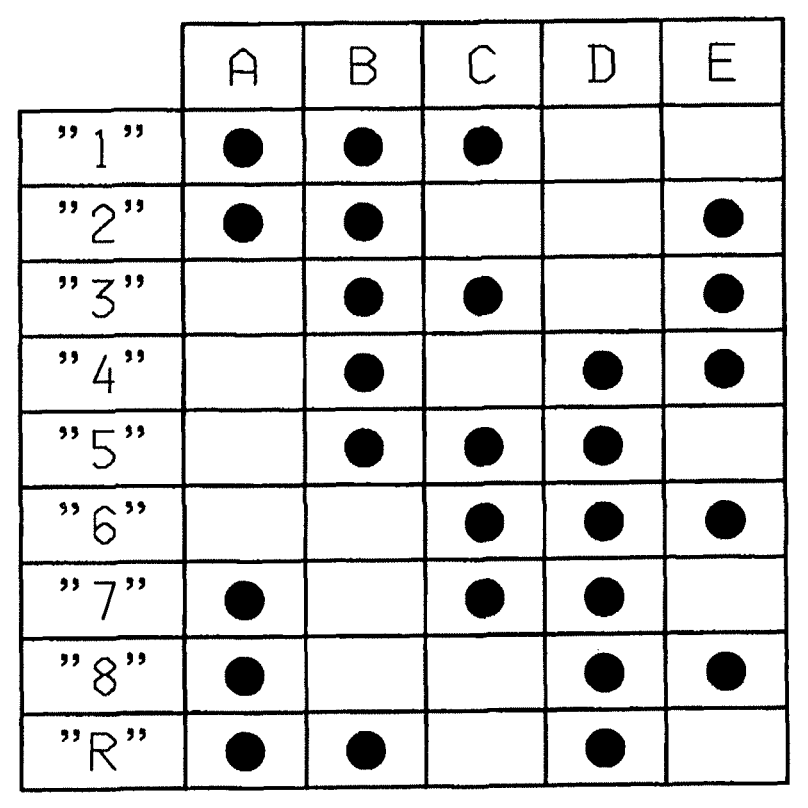

FIG. 3: A shifting scheme of the transmission device in FIG. 2, in tabular form.

DETAILED DESCRIPTION OF THE PREFERRED EMBODIMENTS

Figure 1:
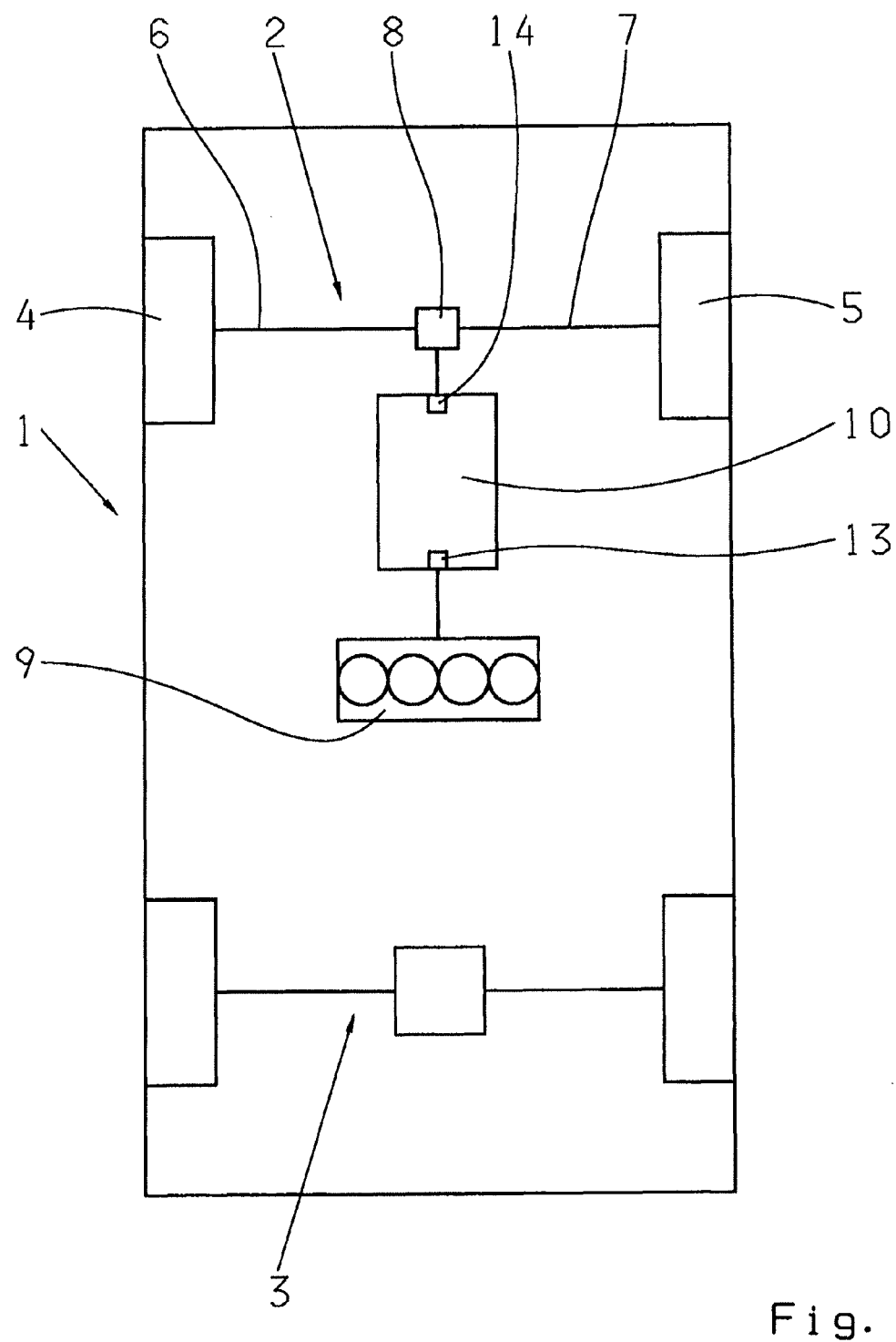
FIG. 1: A very schematic representation of a vehicle drive-train with a transmission device.

FIG. 1 shows a very schematic representation of a vehicle drive-train 1 with a first vehicle axle 2 and a second vehicle axle 3, the first vehicle axle 2 being a front axle of the vehicle and the second vehicle axle 3 being a rear axle of the vehicle. The first vehicle axle 2 has two drive wheels 4, 5 connected, via two drive shafts 6, 7, to a differential transmission unit 8. By means of the differential transmission unit 8, drive torque produced by a drive machine 9, in this case in the form of an internal combustion engine, is distributed in equal parts to the two drive wheels 4 and 5. In addition, between the drive machine 9 and the differential transmission unit 8, a transmission device 10 is provided, in this case in the form of an automatic transmission.

Figure 2:
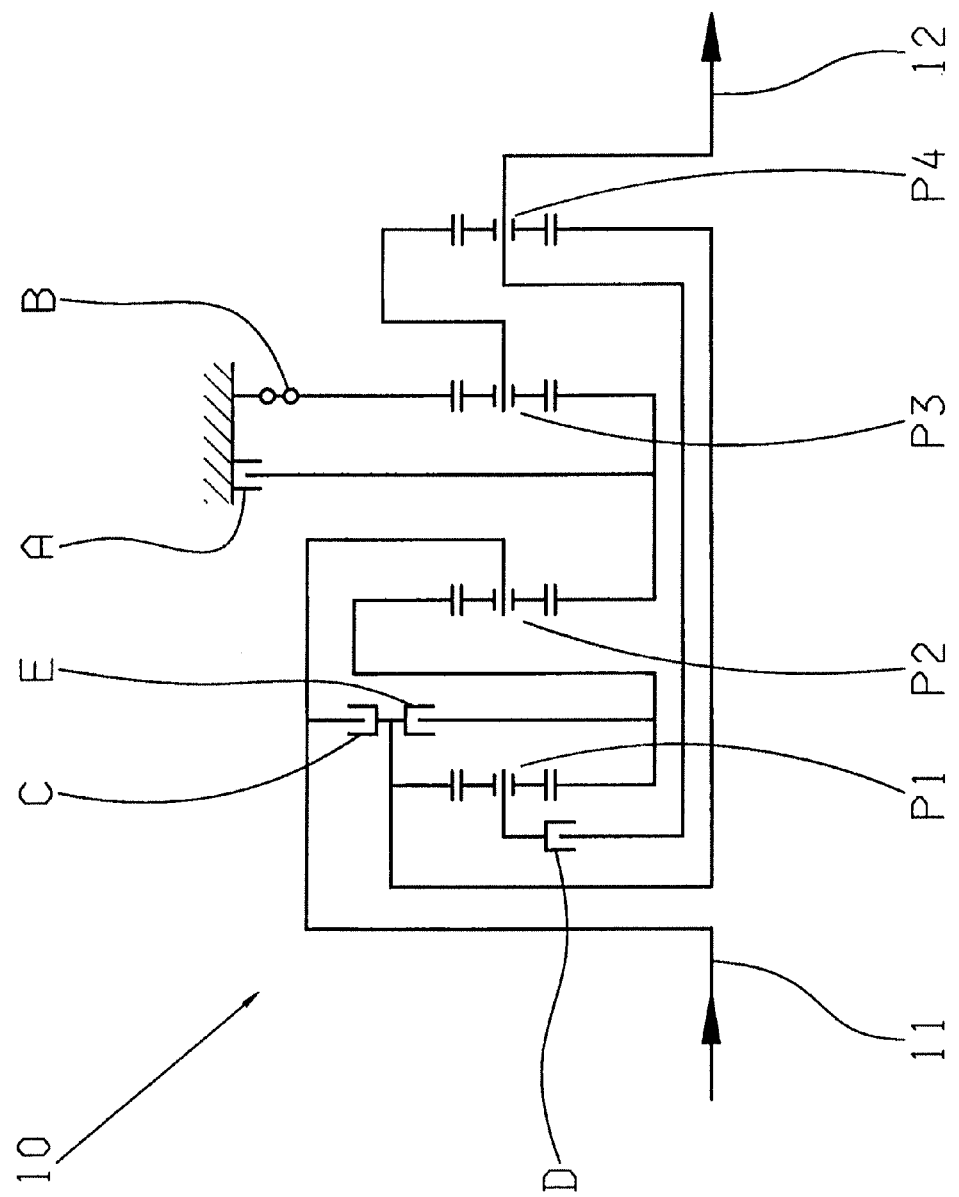
FIG. 2: A diagram showing the gearing layout of the transmission device in FIG. 1.

FIG. 2 shows a gearing layout of the transmission device 10, which is basically known from DE 10 2005 002 337 A1. The transmission device 10 has a drive input shaft 11 and a drive output shaft 12, the latter connected to the differential transmission unit 8 whereas the input shaft 11 is in functional connection with the drive machine 9.

Furthermore, the transmission device 10 comprises four gearsets P1 to P4. In addition the transmission device 10 comprises five shifting elements A to E, of which the shifting elements A and B are brakes and the shifting elements C to E are shifting clutches.

With the shifting elements A to E, as shown in detail by the shifting scheme of FIG. 2 eight forward gears "1" to "8" and one reverse gear "R" can be engaged selectively, such that to obtain a gear ratio in the transmission device 10 or to produce a force flow in the area of the transmission device 10, in each case three of the shifting elements A to E have to simultaneously be brought to or kept in a closed operating condition.

In contrast to the multi-group transmission known from DE 10 2005 002 337 A1, the shifting element B is in the form of an interlocking shifting element so that compared with the multi-group transmission known from the prior art, which is constructed using only frictional shifting elements, during the operation of the transmission device 10 the drag torques associated with open frictional shifting elements are reduced. The other shifting elements A and C to E are frictional shifting elements.

Since in general, interlocking shifting elements can only be changed from an open to a closed operating condition within a very narrow rotational speed difference range around the synchronous speed, the synchronization of the particular interlocking shifting element B to be engaged without additional structural means is assisted by the method according to the invention described in more detail below, or achieved in full by the procedure according to the invention. In the present case the interlocking shifting element B is in the form of a claw brake without any additional synchronization means.

The mode of action of a variant of the method according to the invention will now be explained in more detail with reference to the operating condition progressions of a number of operating parameters of the vehicle drive-train 1 shown in FIG. 1, which are represented in detail as functions of time t in FIG. 4.

In the operating condition progression based on the variations of operating parameter progressions of the vehicle drive-train 1, at a time T1 when the vehicle is rolling, i.e. when the rotational speed of the drive output in the area of the vehicle axle 2 is greater than zero, a transmission control unit is initialized and the transmission device 10 is in a neutral operating condition in which the force flow in the area of the transmission device 10 is interrupted.

As a function of the drive output speed n_ab at time T1, it is determined by means of a so-termed gear following function that due to a demand by the driver for the force flow in the area of the transmission device 10 to be established, the first gear step "1" for forward driving must be engaged in the transmission device 10.

At time T1 the interlocking shifting element B is fully open and to obtain the first gear step "1" it has to be changed from its fully open to its fully closed operating condition. For that reason the two frictional shifting elements A and C, which also have to be engaged in order to obtain the first gear step "1", are acted upon by respective actuating pressures p_A and p_C in accordance with the variations shown in FIG. 4. In this case therefore, the shifting element A is first acted upon with a rapid filling pulse during a rapid filling phase that lasts until a time T2. At a time T3 which coincides approximately with the time T2, the frictional shifting element C is also acted upon with a rapid filling pulse which ends at a time T4.

From time T2 the actuating pressure p_A of the frictional shifting element A is increased along a pressure ramp that ends at a time T5, to an intermediate pressure level at which the frictional shifting element A is in a slip-free operating condition. From time T3, the actuating pressure p_C of the frictional shifting element C is increased along a pressure ramp that ends at a time T6, to an intermediate pressure level such that the frictional shifting element C is also brought to a slip-free operating condition. Until a time T7 which occurs later than the time T6, a motor speed n_mot corresponds essentially to the idling speed of the drive machine 9, since in the area of the transmission device 10 the neutral operating condition "N" is engaged.

Since the two frictional shifting elements A and C are in a slip-free operating condition, a topological forced coupling is established in the transmission device 10 which, in combination with a speed sensor 13 arranged on the transmission input side and a speed sensor 14 arranged on the transmission output side, enables a speed difference nd_B in the area of the interlocking shifting element B to be determined.

The intermediate pressure level of the actuating pressure p_A and the actuating pressure p_C of the frictional shifting elements A and C is lower than the closing pressure level of the frictional shifting elements A and C at which, in each case, the maximum torque can be transmitted by the frictional shifting elements A and C.

If in the area of the interlocking shifting element B, a speed difference nd_B is determined which is outside an admissible speed window of the speed difference nd_B, then in the manner described in more detail below a drive torque m_mot of the drive machine 9 is adjusted to a level that brings the speed difference nd_B of the interlocking shifting element B within the speed window, i.e. within a speed difference range predefined by an upper speed limit nd_Bo and a lower speed limit nd_Bu, within which the interlocking shifting element B is at least approximately in a synchronous condition and can be closed to a desired extent within a predefined engagement time.

Figure 4:
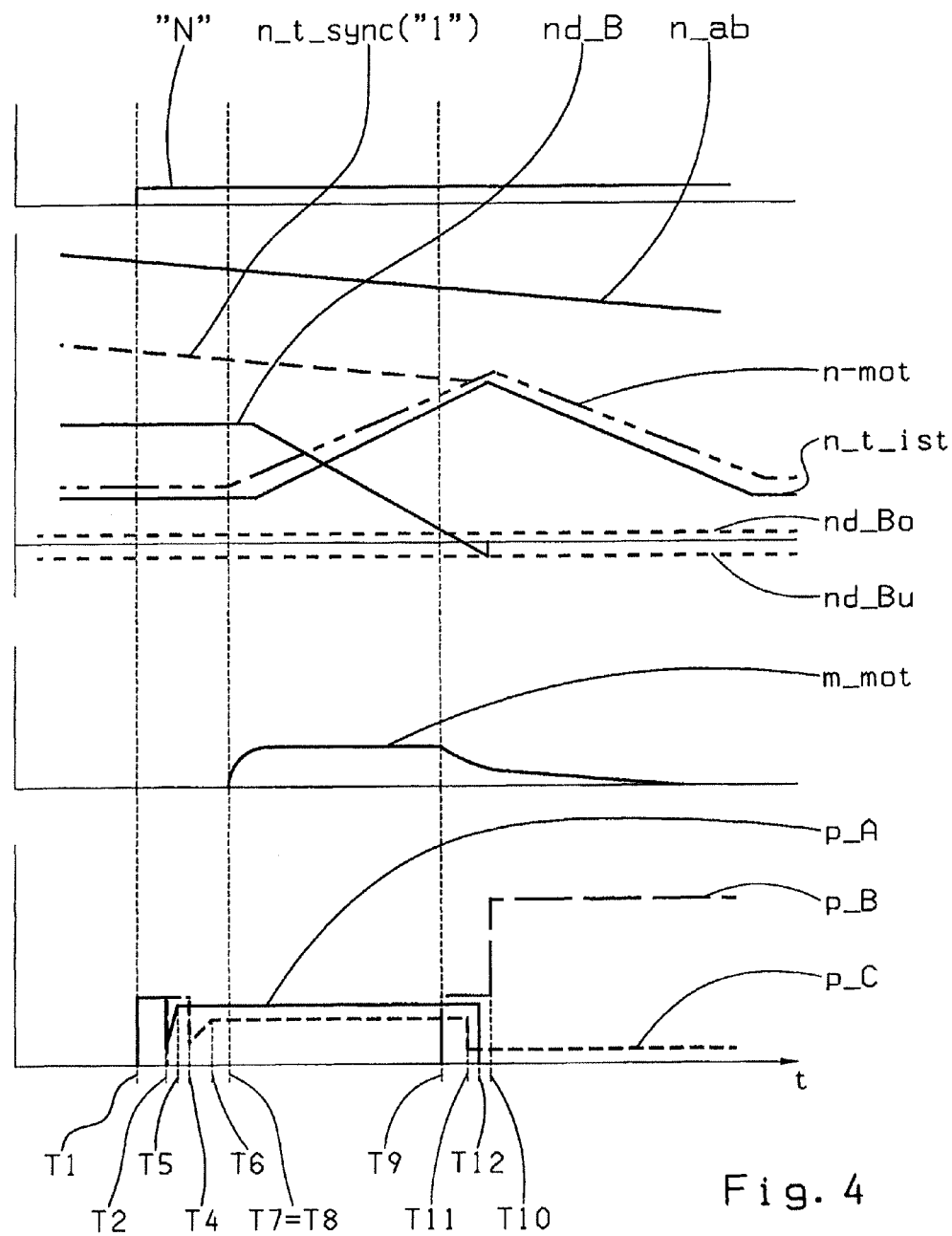
FIG. 4: A number of variations of various operating condition parameters of the vehicle drive-train represented in FIG. 1 during the synchronization, according to the invention, of an interlocking shifting element in the transmission device.

During the operating condition progression based on what is represented in FIG. 4, at a time T8 which essentially coincides with time T7, the speed difference nd_B is outside the speed difference range. At the same time a synchronous speed n_t_sync("1") of a transmission input speed of the transmission device 10 when the first gear ratio step "1" is engaged, is determined on the basis of the current actual drive output speed n_ab multiplied by the gear ratio of the first ratio step "1". As a function of the deviation between the current actual transmission input speed n_t_ist of the transmission device 10 and the calculated synchronous speed n_t_sync("1"), a positive motor action in the area of the drive machine 9 or a positive torque demand is implemented, and the motor torque m_mot is increased from time T8. Alternatively, a desired motor speed n_mot can also be specified.

The increase of the motor torque m_mot of the drive machine 9 brings about an increase of its motor speed n_mot and therefore also of the actual transmission input speed n_t_ist, so that the latter increases in the direction of the synchronous value n_t_sync("1") of the transmission input speed when the first gear step "1" is engaged.

The increase of the actual transmission input speed n_t_ist of the transmission device 10 brings about a reduction of the speed difference nd_B in the area of the interlocking shifting element B so that at a time T9 the speed difference nd_B corresponds to the upper rotational speed difference nd_Bo of the predefined speed difference range.

At time T9 the actuating pressure p_B of the interlocking shifting element B is increased to a pressure level that changes the interlocking shifting element B from its fully open to its closed operating condition, and is left at that level until a time T10. At the same time, from time T9 the motor torque m_mot is adjusted again in the direction of its level at time T8. Before the engagement time T10 of the interlocking shifting element B, at which the actuating pressure p_B of the interlocking shifting element B is increased to the level at which the interlocking shifting element B closes, the actuating pressures p_A and p_C of the frictional shifting elements A and C are reduced at further time points T11 and T12 that are earlier than the engagement time T10, to a pressure level at which essentially no torque can be transmitted by the frictional shifting elements A and C. When doing this, at time T12 the actuating pressure p_A of the frictional shifting element A is reduced essentially to zero whereas at time T11 the actuating pressure p_C of the frictional shifting element C is reduced to the filling pressure level starting from which an increase of the actuating pressure p_C in turn brings about an immediate increase of the transmission capacity of the frictional shifting element C.

With the method described above, during which in the area of the transmission device 10 a transient topological forced coupling is produced by the partial engagement of the frictional shifting elements A and C, the speed difference at the interlocking shifting element B can be determined in a simple and inexpensive manner by means of the two speed sensors 13 and 14 already provided in the area of the transmission device 10 without an additional speed sensor in the area of the interlocking shifting element B. Furthermore, the interlocking shifting element B can be synchronized without elaborate control of several shifting elements in the transmission device 10, by means of a pure controlled regulation sequence. Moreover the transmission device 10 can be designed as a planetary transmission without any additional separator element in the area of the transmission input, such as a hydrodynamic torque converter or a separate starting clutch arranged on the transmission input side, but with an integrated starting clutch, whereby the transmission device 10 can be produced in a space-saving and inexpensive manner.

Advantageously, the interlocking shifting element B of the transmission device 10 can be synchronized within predefined shifting times and very comfortably without structural synchronization devices in the area of the interlocking shifting element B, and changed to its closed operating condition, so the transmission device 10 can be produced with low manufacturing costs and little occupation of fitting space.

In general the method according to the invention can be used during a neutral operating condition of the transmission device 10, at any vehicle speed or any drive output speed and in various operating conditions of the vehicle drive-train 1 whenever, as a function of the current drive output speed at the time, the interlocking shifting element B has to be changed from its fully open to its fully closed operating condition in order, depending on the operating condition, to prepare the transmission device 10 for producing the force flow in the area thereof as required.

This means that on the basis of the gearset scheme of the transmission device 10 shown in FIG. 2, and starting from the neutral operating condition of the transmission device 10, the method according to the invention is also used when required to obtain the second gear step "2", the third gear step "3", the fourth gear step "4", the fifth gear step "5" or the gear ratio "R" for reversing.

INDEXES

1 Vehicle drive-train
2, 3 Vehicle axle
4, 5 Drive wheel
6, 7 Drive shaft
8 Differential transmission unit
9 Drive machine
10 Transmission device
11 Drive input shaft
12 Drive output shaft
13, 14 Rotational speed sensor
A to E Shifting elements
m_mot Drive torque of the drive machine
"N" Neutral operating condition of the transmission device
n_ab Drive output speed n_mot Motor speed
n_t_ist Actual transmission input speed
n_t_sync("1") Synchronous speed of the transmission input speed of the first gear ratio
nd_B Speed difference in the interlocking shifting element B
nd_Bo Upper speed difference limit
nd_Bu Lower speed difference limit
P1 to P4 Planetary gearsets
p_A Actuating pressure of the frictional shifting element A
p_B Actuating pressure of the interlocking shifting element B
p_C Actuating pressure of the frictional shifting element C
t Time
T1 to T12 Discrete time points
"1" to "R" Gear ratios

The invention claimed is:

1. A method of operating a transmission device (10) of a vehicle drive-train (1) that comprises a plurality of frictional shifting elements (A, C to E) and at least one interlocking shifting element (B) for obtaining various gear ratios ("1" to "R"), wherein in a neutral operating condition ("N") of the transmission device (10), in which a force flow is interrupted in an area of the transmission device (10), and in a case of an operating condition variation of the vehicle drive-train (1) in which, when required to establish the force flow in the transmission device (10), the at least one interlocking shifting element (B) has to be changed from a disengaged to an engaged operating condition, the method comprising the steps of:
increasing transmission capacities of at least two frictional shifting elements (A, C), which have to be engaged to produce the force flow, to a level at which the frictional shifting elements (A, C) operate in a slip-free condition,
determining a rotational speed difference (nd_B) in an area of the interlocking shifting element (B), and
adjusting a drive torque (m_mot) of a drive machine (9) to a level that brings the rotational speed difference (nd_B) in the area of the interlocking shifting element (B) to within a predefined speed difference range (nd_Bo, nd_Bu) such that within the predefined speed difference range (nd_Bo, nd_Bu), the interlocking shifting element (B) is in an at least an approximately synchronized condition and can thus be engaged.

2. The method according to claim 1, further comprising a step of reducing the transmission capacities of the two frictional shifting elements (A, C) essentially to zero before engaging the interlocking shifting element (B).

3. The method according to claim 2, further comprising a step of actuating one of the two frictional shifting elements (C) with an actuating force, at an engagement time (T10) of the interlocking shifting element (B) and after the engagement thereof, to immediately increase the transmission capacity of the frictional shifting element (C).

4. The method according to claim 3, further comprising a step of adjusting the drive torque (m_mot) of the drive machine (9) from the engagement time (T10) of the interlocking shifting element (B) to a required level that is dependant on the operating condition.

5. The method according to claim 4, further comprising a step of defining the operating-condition-dependent level of the drive torque (m_mot) to be equivalent to an idling level of the drive torque (n_mot) of the drive machine (9).

6. The method according to claim 1, further comprising a step of determining the speed difference (nd_B), in the area of the interlocking shifting element (B), with two speed sensors (13, 14), and arranging one of the two speed sensors (13) on a transmission input side and arranging the other of the two speed sensors (14) on the transmission output side.

7. A method of operating a transmission in a drive train of a vehicle when shifting the transmission from a neutral operating condition, in which a flow of drive through the transmission is interrupted and an interlocking shift element (B) is disengaged, to a drive operating condition in which the flow of drive through the transmission is established at least by engagement of the interlocking shift element (B), the transmission comprises the interlocking shift element (B) and a plurality of frictional shift elements (A, C, D, E) which are selectively engagable to implement a variety of gear ratios, the method comprising the steps:
increasing transmission capacities of at least two of the plurality of frictional shifting elements (A, C), which are engaged to facilitate the flow of drive, to a level at which the two of the plurality of frictional shifting elements (A, C) substantially operate in a slip-free condition;
determining a rotation speed difference (nd_B) at the interlocking shifting element (B);
adjusting a drive torque (m_mot) of a drive machine (9) to a level at which the rotational speed difference (nd_B) at the interlocking shifting element (B) is within a predefined rotational speed difference range (nd_Bo, nd_Bu) and the interlocking shifting element (B) is at least substantially synchronized; and
engaging the interlocking shifting element (B).

* * * * *